(12) United States Patent
Katsuma et al.

(10) Patent No.: US 7,589,914 B2
(45) Date of Patent: Sep. 15, 2009

(54) MOLDED LENS

(75) Inventors: Toshiaki Katsuma, Saitama (JP); Masao Mori, Saitama (JP); Yu Kitahara, Saitama (JP); Tetsuya Ori, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 35 days.

(21) Appl. No.: 11/826,928

(22) Filed: Jul. 19, 2007

(65) Prior Publication Data

US 2008/0019012 A1      Jan. 24, 2008

(30) Foreign Application Priority Data

Jul. 20, 2006    (JP)    ............................. P2006-197588

(51) Int. Cl.
    *G02B 13/18*    (2006.01)
(52) U.S. Cl. ........................................ 359/719; 359/718
(58) Field of Classification Search .................... 65/37, 65/102; 264/1.32, 2.7; 359/718, 719, 799, 359/811
See application file for complete search history.

(56) References Cited

U.S. PATENT DOCUMENTS

| | | |
|---|---|---|
| 5,987,924 A | 11/1999 | Lee et al. |
| 7,406,233 B2 * | 7/2008 | Seddon et al. ............... 385/114 |
| 2001/0053395 A1 | 12/2001 | Hosoe |
| 2004/0244422 A1 | 12/2004 | Yoneda et al. |
| 2005/0123238 A1 | 6/2005 | Ito |
| 2009/0052056 A1 * | 2/2009 | Katsuma et al. ............... 359/718 |

FOREIGN PATENT DOCUMENTS

| EP | 1881355 A1 * | 1/2008 |
|---|---|---|
| JP | 2001-341134 A | 12/2001 |

OTHER PUBLICATIONS

Office Action issued in connection with related Chinese Application No. 200710137066.5 dated Aug. 29, 2008 with English Translation.

* cited by examiner

*Primary Examiner*—David N Spector
(74) *Attorney, Agent, or Firm*—Birch, Stewart, Kolasch & Birch, LLP

(57) ABSTRACT

A laser beam output from a semiconductor laser light source 1 is transmitted through a cover glass 2 in the optical axis Z direction, is incident on a molded lens 4 in a state of divergent rays, is converted into convergent rays by the molded lens 4, and is applied onto a recording face 5 of the optical recording medium. A diaphragm 3 is arranged. An area of each lens surface onto which a luminous flux of the laser beam restricted by the diaphragm 3 is applied corresponds to an effective area. The following expression (1) is satisfied:

$$d_1 - d_0 \geq 0.04 \text{ mm} \quad (1)$$

where d0 denotes an effective aperture of one of the lens surfaces, and
d1 denotes an outer diameter of the one of the lens surfaces.

24 Claims, 4 Drawing Sheets

MOLDED LENS

CROSS-REFERENCE TO RELATED APPLICATIONS

This application is based upon and claims the benefit of priority from the Japanese Patent Application No. 2006-197588 filed on Jul. 20, 2006; the entire contents of which are incorporated herein by reference.

BACKGROUND OF THE INVENTION

1. Technical Field

The invention relates to a lens manufactured by the mold molding and, more particularly, a molded lens having micro lens diameter such as an imaging lens for a mobile terminal, a recording/reproducing lens for an optical disk, a projecting/receiving lens for optical communication and an objective lens for an endoscope.

2. Description of the Related Art

In recent years, the molded lens is utilized in various uses at the request of weight reduction and cost reduction.

For example, in the case where the molded lens is formed by the injection molding, the molded lens is formed by a series of the following operation processes. That is, plastic material is softened by heating, the material is injected into the mold at a high pressure to transfer an optically transferred surface profile of the mold to the material, the mold is cooled, and then the molded lens is taken out by opening upper and lower portions of the mold.

Meanwhile, it is desired that the optically transferred surface profile of the mold should be transferred satisfactorily to a product lens over the entire surface. However, in the periphery of a lens surface, a molding pressure is hard to apply and thus it is difficult to satisfactory transfer the surface profile of the mold.

On the contrary, when a molding pressure is increased such that a sufficient pressure is applied to the periphery of the lens surface, burr occurs easily.

Also, when a mold clamping force is increased to prevent an occurrence of the burr, it is hard for air to come out of the mold. Thus, air still remains between the mold and the lens surface. As a result, a surface of the mold may not be transferred.

Therefore, in related art, a difference between an outer diameter of the lens surface and an effective aperture of the lens surface is set so large that deterioration of transferability is not caused within the effective aperture of the lens surface.

JP 2001-341134 A (corresponding to US 2001/0053395 A) discloses technology to process a lens optical surface with high precision.

However, with the progress of mobile devices such as a cellular phone, nowadays the demand for size reduction of the imaging lens becomes extremely strong. Thus, an outer diameter of 5 mm or less is going to become the mainstream as an outer diameter of the lens surface of the imaging lens. Further, the demand for an outer diameter of 1 mm or less also becomes stronger.

In such micro lens, it is difficult to utilize JP 2001-341134 A. Also, even though JP 2001-341134 A is used, it is difficult to improve transferability in the peripheral portion of the mold without fail. As a result, unless an effective aperture of the lens surface is set considerably smaller than an outer diameter of the lens surface, a desired refracting action cannot be exerted on rays passing through the peripheral portion of the lens.

Therefore, in order to maintain the optical performances satisfactorily in such situation, the effective aperture of the lens surface is set considerably small. Conversely, in order to ensure the effective aperture of the lens surface having a predetermined size, the diameter of the lens surface is set large, which conflicts with the above demand for size reduction. In this event, such problem arises in not only the molded lens manufactured by the injection molding method but also molded lens manufactured by the compression molding method.

SUMMARY OF THE INVENTION

The invention has been in view of the above circumstances, and provides a molded lens capable of attaining reduction in diameter of a lens surface even in a lens having very small diameter while maintaining good optical performances in a peripheral portion of a lens effective area.

According to an aspect of the invention, a molded lens includes a first lens surface and a second lens surface. The first lens surface satisfies the following conditional expression (1):

$$0.04\,\text{mm} \leq d_1 - d_0 \quad (1)$$

where d0 denotes an effective (usable) aperture of the first lens surface, and d1 denotes an outer diameter of the first lens surface, and, as to the outer diameter d1 of the lens surface, a portion of the boundary portion between an edge portion and a lens portion of the lens, where a level difference is provided on the curved surface constituting the lens portion or a first-order derivative become discontinuous, is determined as an outer edge of the lens surface.

In the field of optics, the expressions "first lens surface" and "first surface of a lens" sometimes mean a light source side of the lens, a surface on an object side of the lens or an incident side of the lens. However, this specification does not employ this definition. Instead, in this specification, one of lens surfaces through which light passes will be simply referred to as a "first lens surface," and another one of the lens surfaces will be referred to as a "second lens surface."

Also, the molded lens may be manufactured by transferring a shape of a mold.

In this case, the first lens surface may be larger in effective aperture than the second lens surface.

Also, the first lens surface may further satisfy the following conditional expression (2).

$$0.04\,\text{mm} \leq d_1 - d_0 \leq 1.00\,\text{mm} \quad (2)$$

Also, the first lens surface may further satisfy the following conditional expression (3).

$$d_0 \leq 1.00\,\text{mm} \quad (3)$$

Also, the outer diameter $d_1$ of the first lens surface may be equal to or less than 5.00 mm.

According to another aspect of the invention, a molded lens includes a first lens surface and a second lens surface. The first lens surface satisfies the following conditional expression (1):

$$0.04\,\text{mm} \leq d_1 - d_0 \quad (1)$$

where $d_0$ denotes an effective aperture of the first lens surface, and $d_1$ denotes an outer diameter of the first lens surface. The second lens surface satisfies the following conditional expression (1)':

$$0.04\,\text{mm} \leq d_1' - d_0' \quad (1)'$$

where $d_0'$ denotes an effective aperture of the second lens surface, and $d_1'$ denotes an outer diameter of the second lens surface.

Also, the molded lens may be manufactured by transferring a shape of a mold.

Also, the first lens surface may further satisfy the following conditional expression (2).

$$0.04 \text{ mm} \leq d_1 - d_0 \leq 1.00 \text{ mm} \quad (2)$$

The second lens surface may further satisfy the following conditional expression (2)'.

$$0.04 \text{ mm} \leq d_1' - d_0' \leq 1.00 \text{ mm} \quad (2)'$$

Also, the first lens surface may further satisfy the following conditional expression (3).

$$d_0 \leq 1.00 \text{ mm} \quad (3)$$

The second lens surface may further satisfy the following conditional expression (3)'.

$$d_0' \leq 1.00 \text{ mm} \quad (3)'$$

Also, the outer diameter $d_1$ of the first lens surface may be equal to or less than 5.00 mm. The outer diameter $d_1'$ of the second lens surface may be equal to or less than 5.00 mm.

In the molded lens described above, the outer diameter $d_1$ ($d_1'$) of the lens surface is formed at least 0.04 mm larger than the effective aperture $d_0$ ($d_0'$) of the lens surface. This numerical value of 0.04 mm was obtained from various investigated results made by the inventors. When the outer diameter $d_1$ ($d_1'$) of the lens surface is set larger than the effective aperture $d_0$ ($d_0'$) of the lens surface at least by 0.04 mm, deterioration in optical performances in the effective area, especially in the peripheral portion, of the lens surface can be prevented.

In other words, the minimum limit of allowance given as a difference between the outer diameter $d_1$ ($d_1'$) of the lens surface and the effective aperture $d_0$ ($d_0'$) of the lens surface corresponds to 0.04 mm. When this allowance is less than 0.04 mm, the optical performances in the effective area of the lens surface are suddenly lowered.

In contrast, when this allowance is in excess of 0.04 mm, the optical performances are improved gently and continuously, nevertheless reduction in diameter of the lens is hampered gradually because the outer diameter $d_1$ ($d_1'$) of the lens surface is increased. As a result, when reduction in diameter of the lens is requested strongly, it becomes important that this allowance should be set less than 1.00 mm, for example.

DETAILED DESCRIPTION OF EMBODIMENTS OF THE INVENTION

Figure 1:
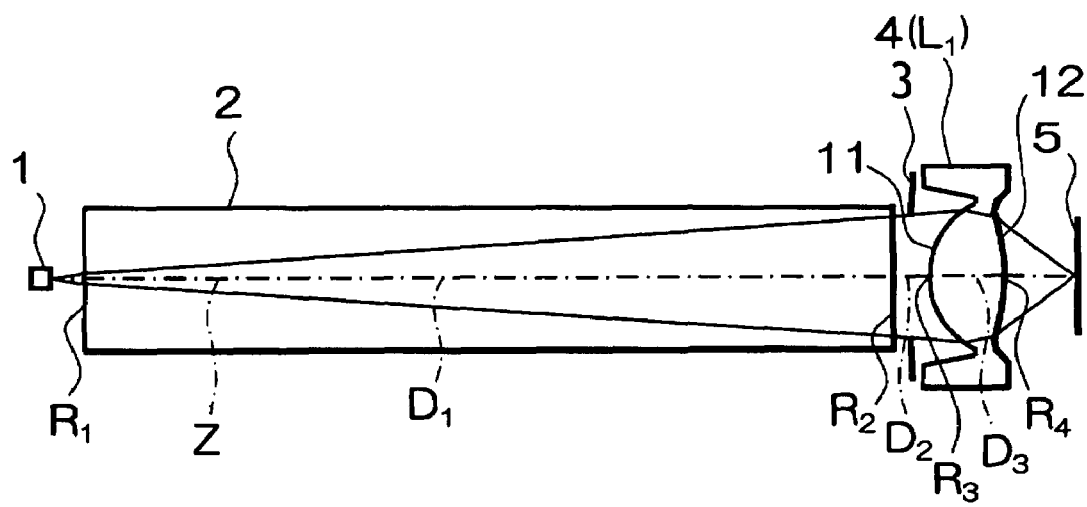
FIG. 1 is a view showing the configuration of an optical system of an optical recording device using a molded lens according to an embodiment (Example 1) of the invention.
Figure 2:
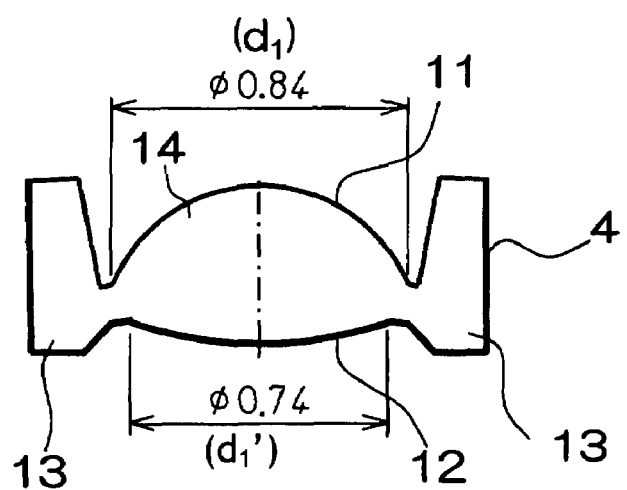
FIG. 2 is an enlarged view showing a shape of the molded lens according to Example 1.

Embodiments of the invention will be described with reference to the drawings hereinafter. FIG. 1 is a view showing the configuration of an optical system of an optical recording device using a molded lens 4 ($L_1$) according to this embodiment of the invention. FIG. 2 is an enlarged view showing a shape of this molded lens 4.

As shown in FIG. 1, in the optical system of the optical recording device, a laser beam output from a semiconductor laser light source 1 is transmitted through a cover glass 2 in the optical axis Z direction, is incident on the molded lens 4 according to this embodiment in a state of divergent rays, is converted into convergent rays by the molded lens 4, and is applied onto a recording face 5 of the optical recording medium.

Also, a diaphragm 3 is arranged between the cover glass 2 and the molded lens 4. An area of each lens surface onto which a luminous flux of the laser beam restricted by the diaphragm 3 is applied corresponds to an effective area. A diameter of this effective area corresponds to effective apertures $d_0$, $d_0'$ of third and fourth surfaces 11, 12. As listed in Table 2, the effective aperture $d_0$ of the third surface 11 (the surface of the molded lens on the light source side) is 0.78 mm, and the effective aperture $d_0'$ of the fourth surface 12 (the surface of the molded lens on the recording face side) is 0.68 mm. The effective aperture represents the usable aperture herein.

In contrast, as shown in FIG. 2, an outer diameter $d_1$ of the third surface 11 is 0.84 mm, and an outer diameter $d_1'$ of the fourth surface 12 is 0.74 mm.

Therefore, in an example of the molded lens 4 of this embodiment, a value obtained by subtracting the effective aperture $d_0$ ($d_0'$) of each of the third and fourth surface 11, 12 from the outer diameter $d_1$ ($d_1'$) of each of the third and fourth surfaces 11, 12 is 0.06 mm.

In fact, as the molded lens of this embodiment, this subtracted value may be increased larger like 0.07 mm, 0.08 mm, . . . , or may be decreased smaller like 0.05 mm, 0.04 mm, . . . . It is, of course, that size reduction and weight reduction of the lens is advanced as this value is decreased smaller.

In the molded lens of this embodiment, the following conditional expressions (1), (1') are satisfied.

$$d_1 - d_0 \geq 0.04 \text{ mm} \quad (1)$$

$$d_1' - d_0' \geq 0.04 \text{ mm} \quad (1')$$

In other words, when the value obtained by subtracting the effective aperture $d_0$ ($d_0'$) of each lens surface from the outer diameter $d_1$ ($d_1'$) of each lens surface is below 0.04 mm, an area of the peripheral portion of the mold in which transferability is extremely bad is contained in the effective area. Thus, it is difficult to obtain the good optical performances. As a result, unless the effective aperture $d_0$ ($d_0'$) of each lens surface is set smaller than the outer diameter $d_1$ ($d_1'$) of each lens surface by 0.04 mm or more, desired refracting action cannot be exerted on the rays passing through the peripheral portion of the lens.

It is preferable that the following conditional expression (2), (2)' are satisfied.

$$0.04 \text{ mm} \leq d_1 - d_0 \leq 1.00 \text{ mm} \quad (2)$$

$$0.04 \text{ mm} \leq d_1' - d_0' \leq 1.00 \text{ mm} \quad (2')$$

In other words, if the conditional expression (2) or (2') exceeds 1.00 mm, the outer diameter $d_1$ ($d_1'$) of the lens surface is increased correspondingly. Therefore, when diameter reduction of the lens is required strongly, for example, when the molded lens is used as an imaging lens installed into the latest cellular phone, mobile device, or the like, $d_1-d_0$ ($d_1'-d_0'$) exceeding 1.00 mm conflicts with the demand for size reduction.

Also, more preferably, the following conditional expression (2''), (2''') is satisfied.

$$0.04 \text{ mm} \leq d_1 - d_0 \leq 0.60 \text{ mm} \quad (2'')$$

$$0.04 \text{ mm} \leq d_1' - d_0' \leq 0.60 \text{ mm} \quad (2''')$$

That is, as shown in the conditional expressions (2''), (2'''), when its upper limit is set to 0.60 mm, such condition is more advantageous in size reduction of the lens. Size reduction of the lens is more advanced than the case where only the restrictions given by the conditional expressions (2), (2') are satisfied.

Also, as to the outer diameter $d_1$ ($d_1'$) of each lens surface, as shown specifically in FIG. 2, a portion of the boundary portion between an edge portion 13 and a lens portion 14 of the lens, where a level difference is provided on the curved surface constituting the lens portion 14 or a first-order derivative become discontinuous, is determined as an outer edge of each lens surface.

Figure 3:
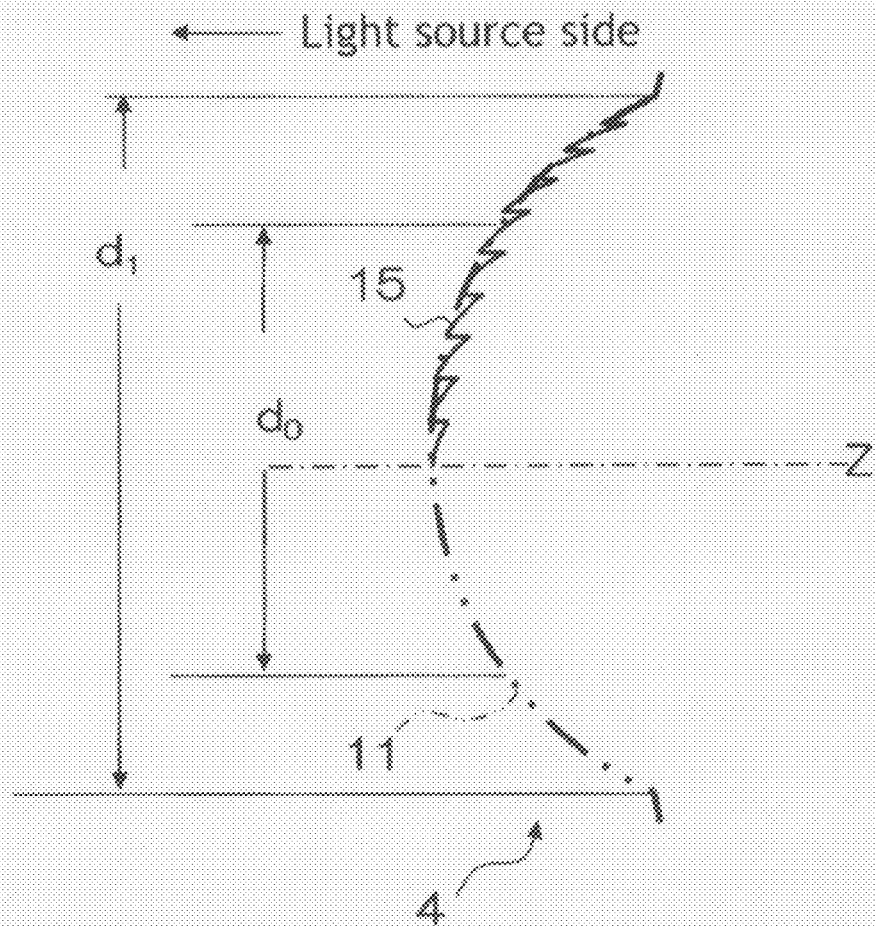
FIG. 3 is a view explaining decision criteria for an outer diameter of a lens surface when the lens surface is formed with a diffraction optical surface.

Also, when the lens surface is formed as a diffraction optical surface, the diffraction optical surface itself is removed from determination of the outer diameter $d_1$ ($d_1'$) of the lens surface. In this case, as shown in FIG. 3, a hypothetical curved surface (indicated with a chain double-dashed line) that constitutes an aspheric (or spherical) shape serving as a base of the diffractive optical surface 15 is considered in determining the outer diameter $d_1$ ($d_1'$).

Also, it is requested as conditions that in the $d_1-d_0$ section ($d_1'-d_0'$ section), no level difference is formed on the aspheric surface (or spherical surface) that is the base in the direction along which the optical axis Z extends and also the first-order derivative is continuous.

Meanwhile, the recent demand for size reduction of mobile devices such as a cellular phone, etc. is very strong. According to this demand, an outer diameter of 5 mm or less is going to become the mainstream of the outer diameter of the lens surface of the imaging lens. Further, the demand for the outer diameter of 1 mm or less becomes stronger. However, in the case of such micro lens, the transferability of the mold in the peripheral portion becomes extremely bad even when various technologies in the related art are employed. Therefore, the molded lens 4 of this embodiment is particularly effective to the case where this lens 4 is applied to the micro lens that satisfies the following conditional expressions (3), (3').

$$d_0 \leq 1.00 \text{ mm} \quad (3)$$

$$d_0' \leq 1.00 \text{ mm} \quad (3')$$

Next, out of the molded lenses according to the embodiments that can satisfy the conditional expression (1), Example 1, Example 2 as the best type, and their advantages of getting size reduction will be explained specifically hereunder while using data.

EXAMPLE 1

The molded lens according to Example 1 of the invention was formed by molding plastic material using the injection molding mold. As shown in FIG. 1, this molded lens was formed of a single lens $L_1$, and also a surface of the lens $L_1$ on the light source side (third surface) and a surface of the lens $L_1$ on the image surface side (fourth surface) were formed into an aspheric shape.

Here, these aspheric surfaces are given by following aspheric formula.

$$Z = \frac{C \cdot Y^2}{1 + \sqrt{1 - K \cdot C^2 \cdot Y^2}} + A_2 Y^4 + A_3 Y^6 + A_4 Y^8 + A_5 Y^{10} \quad (4)$$

Where
  Z: a length of perpendicular from a point on an aspheric surface at a height Y from an optical axis to a tangent plane (a plane perpendicular to the optical axis) of an aspheric vertex
  C: reciprocal of a radius of curvature R of the aspheric surface near the optical axis
  Y: height from the optical axis
  K: eccentricity
  $A_2, A_3, A_4, A_5$: fourth, sixth, eighth, and tenth-order aspheric coefficients Also, respective numerical values concerning the optical system (corresponding to FIG. 1. A first surface and a second surface correspond to a beam incident plane and a beam output plane of the cover glass 2, respectively) using the molded lens 4 according to this Example 1 are given in the following table 1.

In the middle stage of the table 1, a radius of curvature R (mm) of each optical surface, a surface separation D (mm) on the optical axis Z, and a refractive index N in the used wavelength of each lens are shown. Here, numbers in the table denote the order of surfaces from the light source side.

Also, in the upper stage of the table 1, the working conditions of the molded lens 4, i.e., a wavelength of the used light, a used magnification, and a numerical aperture NA are shown.

Also, in the lower stage of the table 1, a paraxial curvature C of the aspheric surface and constants K, $A_2, A_3, A_4, A_5$ indicated in the above aspheric formula are shown.

TABLE 1

| Used wavelength | | 650 nm | |
| Used magnification | | −1/6.0 | |
| NA | | 0.60 | |

| Surface Number | R | D | Refractive Index |
|---|---|---|---|
| 1 | ∞ | 4.705 | 1.45654 |
| 2 | ∞ | 0.200 | 1.00000 |
| 3 | Aspheric | 0.440 | 1.50591 |
| 4 | Aspheric | | |

| Aspheric Coefficient | | |
|---|---|---|
| | 3rd surface | 4th surface |
| C | 2.8317669 | −1.5117021 |
| K | 0.0000000 | 0.0000000 |
| $A_2$ | $4.2511270 \times 10^{-1}$ | 4.1361891 |
| $A_3$ | 4.0881268 | $−1.7621811 \times 10$ |
| $A_4$ | $−1.0828489 \times 10$ | $3.0403595 \times 10$ |
| $A_5$ | −6.8160253 | −1.3579028 |

Also, in the table 2, the effective aperture of the lens surface and the outer diameter of the lens surface of the surface on the light source side (third surface) and the surface on the recording face side (fourth surface) in the molded lens 4 according to this Example are shown.

TABLE 2

| Effective Aperture of Lens Surface | |
|---|---|
| Third surface | φ0.78 mm |
| Fourth surface | φ0.68 mm |
| Outer Diameter of Lens Surface | |
| Third surface | φ0.84 mm |
| Fourth surface | φ0.74 mm |

Figure 4:
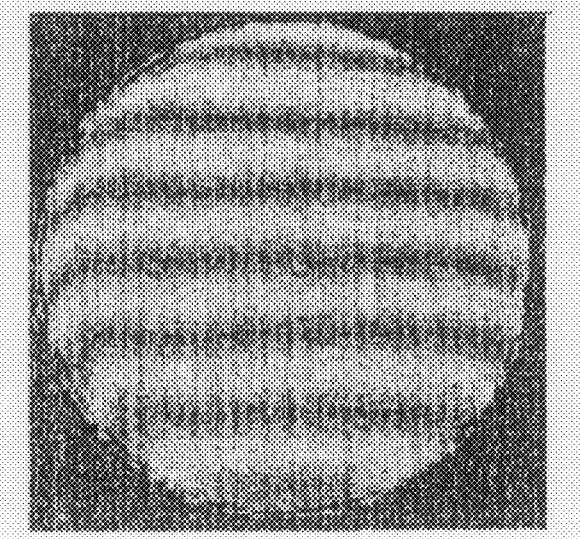
FIG. 4 is a view of an image of interference fringes that indicate a state of transmitted wavefronts in the molded lens according to Example 1.

FIG. 4 shows interference fringes in a state of transmitted wavefronts in the molded lens according to Example 1. A full field range was set to just coincide with the effective aperture.

According to the molded lens of this Example, it is apparent from FIG. 4 that a good state of transmitted wavefronts can be brought about over the full range of the effective aperture.

EXAMPLE 2

Figure 5:
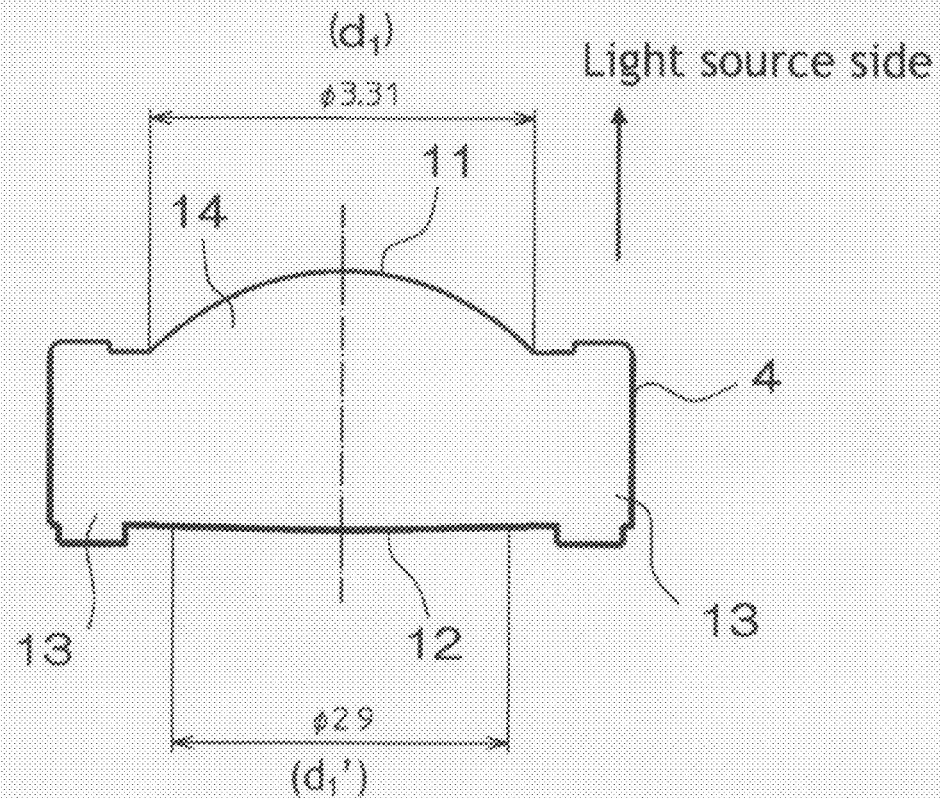
FIG. 5 is an enlarged view showing a shape of a molded lens according to Example 2.

Like Example 1, the molded lens according to Example 2 of the invention was formed by molding the plastic material using the injection molding mold. As shown in FIG. 5, this molded lens was formed of a single lens 4, and also a surface of the lens 4 on the light source side (first surface) and a surface of the lens 4 on the image surface side (second surface) were formed into the aspheric shape. Here, reference symbols in FIG. 5 correspond to those of Example 1 shown in FIG. 2 (this is also true of Example 3 in FIG. 8).

Here, these aspheric surfaces are given by above aspheric formula.

Also, respective numerical values concerning the molded lens 4 according to this Example 2 are shown in the following table 3.

In the middle stage of the table 3, a radius of curvature R (mm) of each optical surface, a surface separation D (mm) on the optical axis Z, and a refractive index N in the used wavelength of each lens are given. Here, the numbers in this stage denote the order of surfaces from the light source side.

Also, in the upper stage of the table 3, the working conditions of the molded lens 4, i.e., a wavelength of the used light (used wavelength), a used magnification, and a numerical aperture NA are given.

Also, in the lower stage of the table 3, a paraxial curvature C of the aspheric surface and constants K, $A_2$, $A_3$, $A_4$, $A_5$ indicated in the above aspheric formula are shown.

TABLE 3

| Used wavelength | 632.8 nm | | |
|---|---|---|---|
| Used magnification | 0 (infinite conjugate) | | |
| NA | 0.49 | | |
| Surface Number | R | D | Refractive Index |
| 1 | Aspheric | 2.20 | 1.59869 |
| 2 | Aspheric | | 1.00000 |
| Aspheric Coefficient | | | |
| | 1st surface | 2nd surface | |
| C | 0.4657700 | −0.0582414 | |
| K | 0.0000000 | 0.0000000 | |

TABLE 3-continued

| $A_2$ | $6.7556608 \times 10^{-3}$ | $1.2820990 \times 10^{-2}$ |
|---|---|---|
| $A_3$ | $1.3804821 \times 10^{-4}$ | $-7.8661655 \times 10^{-3}$ |
| $A_4$ | $-3.0027569 \times 10^{-5}$ | $3.9259256 \times 10^{-3}$ |
| $A_5$ | $1.8998577 \times 10^{-5}$ | $-7.7682430 \times 10^{-4}$ |

Also, in table 4, the effective aperture of the lens surface and the outer diameter of the lens surface of the surface on the light source side (first surface) and the surface on the recording face side (second surface) in the molded lens 4 according to this Example are shown.

TABLE 4

| Effective Aperture of Lens Surface | |
|---|---|
| First surface | φ3.27 mm |
| Second surface | φ2.34 mm |
| Outer Diameter of Lens Surface | |
| First surface | φ3.31 mm |
| Second surface | φ2.90 mm |

In the above Examples 1, 2, the molded lens formed by the injection molding method is explained. The molded lens of the invention is not limited to these molded lenses. For example, as shown in the following Example 3, the invention may be applied to molded lens formed by the compression molding method.

EXAMPLE 3

Figure 7:
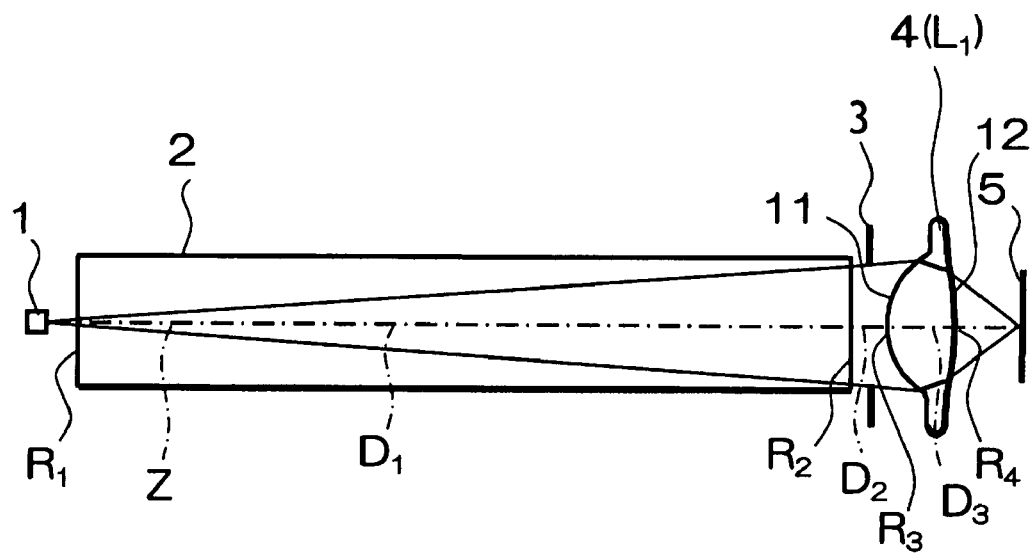
FIG. 7 is a view showing the configuration of an optical system of an optical recording device using a molded lens according to Example 3.
Figure 8:
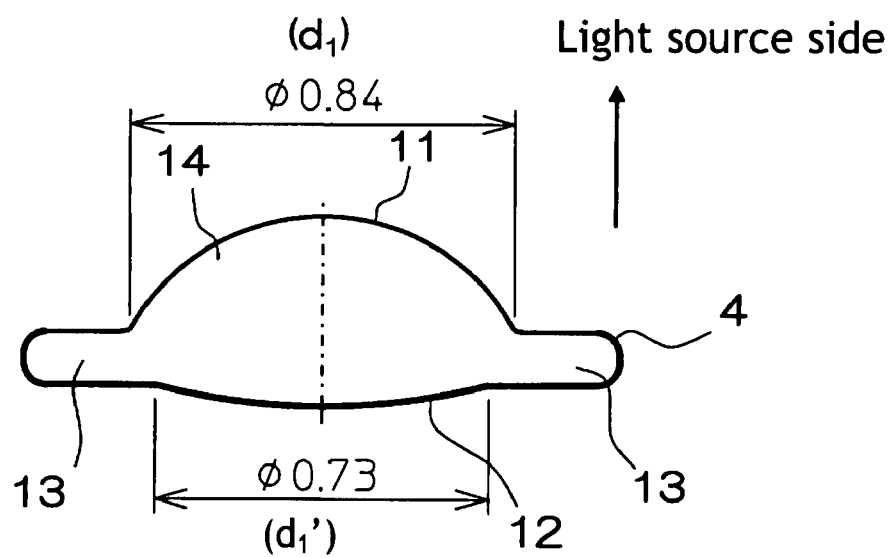
FIG. 8 is an enlarged view showing a shape of the molded lens according to Example 3.

FIG. 7 is a view showing the configuration of an optical system of an optical recording device using a molded lens according to Example 3 of the invention. FIG. 8 is an enlarged view showing the molded lens according to Example 3.

The device shown in FIG. 7 is constructed substantially similarly to the configuration of the optical system of the optical recording device using the molded lens according to the above Example 1 shown in FIG. 1. Therefore, the same reference symbols are assigned to the respective portions corresponding to those in FIG. 1, and their detailed explanation will be omitted herein.

The molded lens according to Example 3 of the invention was formed by molding a glass material using the compression molding mold. As shown in FIG. 7, this molded lens was formed of a single lens $L_1$, and also a surface of the lens $L_1$ on the light source side (third surface) and a surface of the lens $L_1$ on the image surface side (fourth surface) were formed into an aspheric shape.

Here, these aspheric surfaces are given by the above aspheric formula.

In the middle stage of table 5, a radius of curvature R (mm) of each optical surface, a surface separation D (mm) on the optical axis Z, and a refractive index N in the used wavelength of each lens are shown. Here, numbers in this stage denote the order of surfaces from the light source side.

Also, in the upper stage of the table 5, the working conditions of the molded lens 4, i.e., a wavelength of the used light (used wavelength), a used magnification, and a numerical aperture NA are shown.

Also, in the lower stage of the table 5, a paraxial curvature C of the aspheric surface and constants K, $A_2$, $A_3$, $A_4$, $A_5$ indicated in the above aspheric formula are shown.

TABLE 5

| Used wavelength | | 650 nm | |
| --- | --- | --- | --- |
| Used magnification | | −1/6.0 | |
| NA | | 0.61 | |
| Surface Number | R | D | Refractive Index |
| 1 | ∞ | 4.705 | 1.45654 |
| 2 | ∞ | 0.200 | 1.00000 |
| 3 | Aspheric | 0.410 | 1.58537 |
| 4 | Aspheric | | |

| Aspheric Coefficient | | |
| --- | --- | --- |
| | 3rd surface | 4th surface |
| C | 2.6553553 | −0.9506208 |
| K | 0.0000000 | 0.0000000 |
| $A_2$ | $3.3491933 \times 10^{-1}$ | 1.4246892 |
| $A_3$ | $2.7136608 \times 10^{-1}$ | −2.7744714 |
| $A_4$ | $5.0482746 \times 10^{-2}$ | $-3.5195348 \times 10^{-2}$ |
| $A_5$ | $5.4545204 \times 10^{-5}$ | $-3.3333837 \times 10^{-5}$ |

Also, in table 6, the effective aperture of the lens surface and the outer diameter of the lens surface of the surface on the light source side (third surface) and the surface on the recording face side (fourth surface) in the molded lens 4 according to this Example are shown.

TABLE 6

| Effective Aperture of Lens Surface | |
| --- | --- |
| Third surface | φ0.79 mm |
| Fourth surface | φ0.69 mm |
| Outer Diameter of Lens Surface | |
| Third surface | φ0.84 mm |
| Fourth surface | φ0.73 mm |

Here, as the molded lens of the invention, the above lens made of the plastic material or the glass material can be employed adequately. For example, advantages such as cost reduction, weight reduction, and the like can be achieved by using the plastic material as the molded lens forming material. Also, environment resistance performances (temperature characteristics, humidity characteristics, etc.) can be improved by using the glass material as the molded lens forming material.

In the above Examples, the both surfaces of the molded lens having the aspheric surface are explained. However, surfaces of the molded lens may be formed into the spherical surface or formed with a diffractive optical surface. Of course, the surfaces of the molded lens may be formed into mutually different type surfaces. For example, one surface of the both surfaces is formed into the spherical surface, and the other surface is formed into the aspheric surface.

<Performance Verification 1>

Figure 6:
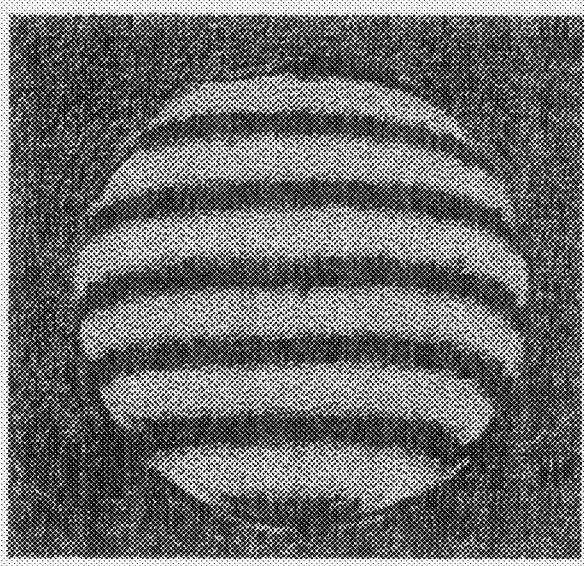
FIG. 6 is a view of an image of interference fringes that indicate a state of transmitted wavefronts in the molded lens according to Performance Verification 1.

In the molded lens 4 of the above Example 2, the interference fringe image in the outer peripheral portion, as shown in FIG. 6, was observed. Here, a full field range of this interference fringe image was set to just coincide with the outer diameter of the lens surface. From this observation, a pulse-like disturbance of wavefront was found on the slightly inner side from the outer diameter. It may be considered that this disturbance of wavefront was caused due to transferring of the mold was made insufficiently. The disturbance of wavefront was caused in a position of about φ3.277 mm of the lens surface, and was located about 0.0165 mm inner than the outer diameter (φ3.31 mm) of the lens.

Therefore, like the molded lens of this embodiment, if a difference between the outer diameter of each lens surface and the effective aperture of each lens surface is set to be equal to or larger than 0.04 mm, this disturbance of wavefront is located on the outside of the effective aperture. As a result, it is apparent that desired refracting action can be exerted in the overall effective aperture of each lens surface.

Also, in table 7, when an injection pressure and a mold clamping force applied to the molded lens 4 in the injection molding method in the Example 2 were varied to high (strong), middle, and low (weak) respectively, evaluations of three conditions are shown in four grades respectively. The three conditions include whether or not the transferability (transferability for $0.04 \leq d_1 - d_0$ ($d_1' - d_0'$)) in the peripheral portion of the effective aperture of the lens surface represented by $0.04 \leq d_1 - d_0$ ($d_1' - d_0'$) is good (first condition), whether or not no burr occurs (second condition), and whether or not air vent is ensured (third condition). Also, in the table 7, the transferability (transferability for $d_1 - d_0$ ($d_1' - d_0'$)<0.04) in the peripheral portion of the effective aperture of the lens surface represented by $d_1 - d_0$ ($d_1' - d_0'$)<0.04 was given (the same is true in Table 8).

Also, the "air vent" means escape of an internal air when the mold is clamped. As described above, if internal air cannot vent to some extent when the mold is clamped, the transferability becomes worse due to the presence of such air. Therefore, this air vent constitutes an important condition in evaluating the transferability.

Also, the mold clamping force is determined depending on size of the lens to be molded. For example, when a "middle" pressure was assumed to 1, a "low" pressure and a "high" pressure were set to about 0.75 and 1.25, respectively.

As a result, the combination of "the 'middle' injection pressure and the 'middle' mold clamping force" and the combination of "the 'low' injection pressure and the 'low' mold clamping force" were not determined as "bad x" or "baddish Δ" in any of the estimations of the three conditions. Thus, it became apparent that preferably the injection molding process is performed with either of these two combinations.

TABLE 7

| | Injection molding | | | | | | | | |
| --- | --- | --- | --- | --- | --- | --- | --- | --- | --- |
| | Injection pressure | | | | | | | | |
| | High | High | High | Mid | Mid | Mid | Low | Low | Low |
| | Mold clamping pressure | | | | | | | | |
| | High | Mid | Low | High | Mid | Low | High | Mid | Low |
| Transferability for $d_1-d_0<0.04$ | X | Δ | ○ | X | X | Δ | X | X | X |
| Transferability for $0.04 \leq d_1-d_0$ | Δ | ⊙ | ⊙ | Δ | ⊙ | ⊙ | X | Δ | ○ |

TABLE 7-continued

| | Injection molding | | | | | | | | |
| --- | --- | --- | --- | --- | --- | --- | --- | --- | --- |
| | Injection pressure | | | | | | | | |
| | High | High | High | Mid | Mid | Mid | Low | Low | Low |
| | Mold clamping pressure | | | | | | | | |
| | High | Mid | Low | High | Mid | Low | High | Mid | Low |
| Occurrence of burr | ○ | Δ | X | ⊙ | ○ | Δ | ⊙ | ⊙ | ○ |
| Air vent | Δ | Δ | ○ | Δ | ○ | ⊙ | X | Δ | ○ |

⊙ Good
○ Fair
Δ Baddish
X Bad

<Performance Verification 2>

Also, in Table 8, when a molding pressure at a high temperature and a molding pressure at a time of cooling applied to the molded lens 4 in the compression molding method in Example 3 were varied to high, middle, and low, evaluations of two conditions are shown in four grades, respectively. The two conditions include whether or not the transferability (transferability for $0.04 \leq d_1-d_0$) in the peripheral portion of the effective aperture of the lens surface represented by $0.04 \leq d_1-d_0$ is good (first condition), and whether or not no chip occurs in the peripheral portion of the lens (second condition).

In the case of the compression molding, unlike the injection molding, the molding pressure at a high temperature and the molding pressure at a time of cooling have an influence upon the transferability in the peripheral portion of the effective aperture of the lens surface and the chip in the peripheral portion of the lens. Therefore, these conditions constitute the important conditions in evaluating the transferability of the mold.

Also, the molding pressure at a high temperature and the molding pressure at a time of cooling are determined depending on size of the lens to be molded. For example, when a "middle" pressure was assumed to 1, a "low" pressure and a "high" pressure were set to about 0.5 and 1.5, respectively.

As a result, the combination of "the 'high' molding pressure at a high temperature and the 'low' molding pressure at a time of cooling" and the combination of "the 'middle' molding pressure at a high temperature and the 'middle' molding pressure at a time of cooling" were not determined as "bad x" or "baddish Δ" in any of the estimations of the two conditions could. Thus, it became apparent that preferably the compression molding process is performed with either of these two combinations.

TABLE 8

| | Compression molding | | | | | | | | |
| --- | --- | --- | --- | --- | --- | --- | --- | --- | --- |
| | Molding pressure at high temp. | | | | | | | | |
| | High | High | High | Mid | Mid | Mid | Low | Low | Low |
| | Molding pressure at time of cooling | | | | | | | | |
| | High | Mid | Low | High | Mid | Low | High | Mid | Low |
| Transferability for $d_1-d_0<0.04$ | ○ | Δ | Δ | Δ | Δ | X | X | X | X |
| Transferability for $0.04 \leq d_1-d_0$ | ⊙ | ⊙ | ○ | ○ | ○ | Δ | Δ | Δ | X |
| Chip in peripheral portion. | X | Δ | ○ | X | ○ | ○ | X | ○ | ⊙ |

⊙ Good
○ Fair
Δ Baddish
X Bad

What is claimed is:

1. A lens comprising:

a first lens surface which transitions to a lens edge portion at a point where a first-order derivative for the first lens surface becomes discontinuous; and a second lens surface which transitions to said lens edge portion at a point where a first-order derivative for the second lens surface becomes discontinuous, wherein:

the first lens surface satisfies the following conditional expression (1):

$$0.04 \text{ mm} \leq d_1-d_0 \tag{1}$$

where $d_0$ denotes an usable aperture of the first lens surface, and $d_1$ denotes an outer diameter of the first lens surface, said outer diameter encompassing the lens surface up to said point where the first-order derivative for the first lens surface becomes discontinuous, wherein the first lens surface is larger in usable aperture than the second lens surface.

2. The lens according to claim 1, wherein the first lens surface further satisfies the following conditional expression (2)

$$0.04 \text{ mm} \leq d_1-d_0 \leq 1.00 \text{ mm} \tag{2}$$

3. The lens according to claim 1, wherein the first lens surface further satisfies the following conditional expression (3)

$$d_0 \leq 1.00 \text{ mm} \quad (3).$$

4. The lens according to claim 1, wherein:
the first lens surface further satisfies the following conditional expression (2), $$0.04 \text{ mm} \leq d_1 - d_0 \leq 1.00 \text{ mm} \quad (2)$$

and the first lens surface further satisfies the following conditional expression (3)

$$d_0 \leq 1.00 \text{ mm} \quad (3).$$

5. The lens according to claim 1, wherein the outer diameter $d_1$ of the first lens surface is equal to or less than 5.00 mm.

6. The lens according to claim 1, wherein
the first lens surface further satisfies the following conditional expression (2), $$0.04 \text{ mm} \leq d_1 - d_0 \leq 1.00 \text{ mm} \quad (2)$$

and the outer diameter $d_1$ of the first lens surface is equal to or less than 5.00 mm.

7. The lens according to claim 1, wherein:
the first lens surface further satisfies the following conditional expression (3), $$d_0 \leq 1.00 \text{ mm} \quad (3)$$

and the outer diameter $d_1$ of the first lens surface is equal to or less than 5.00 mm.

8. The lens according to claim 1, wherein:
the first lens surface further satisfies the following conditional expression (2), $$0.04 \text{ mm} \leq d_1 - d_0 \leq 1.00 \text{ mm} \quad (2)$$

the first lens surface further satisfies the following conditional expression (3), $$d_0 \leq 1.00 \text{ mm} \quad (3)$$

and the outer diameter d1 of the first lens surface is equal to or less than 5.00 mm.

9. A lens comprising:
a first lens surface which transitions to a lens edge portion at a point where a first-order derivative for the first lens surface becomes discontinuous; and
a second lens surface which transitions to said lens edge portion at a point where a first-order derivative for the second lens surface becomes discontinuous, wherein:
the second lens surface satisfies the following conditional expression (1)':

$$0.04 \text{ mm} \leq d_1' - d_0' \quad (1)'$$

where
$d_0'$ denotes an usable aperture of the second lens surface, and
$d_1'$ denotes an outer diameter of the second lens surface, said outer diameter encompassing the lens surface up to said point where the first-order derivative for the second lens surface becomes discontinuous.
wherein the first lens surface is larger in usable aperture than the second lens surface.

10. The lens according to claim 9, wherein:
the second lens surface further satisfies the following conditional expression (2)'

$$0.04 \text{ mm} \leq d_1' - d_0' 1.00 \text{ mm} \quad (2)'.$$

11. The lens according to claim 9, wherein:
the second lens surface further satisfies the following conditional expression (3)'

$$d_0' \leq 1.00 \text{ mm} \quad (3)'.$$

12. The lens according to claim 9, wherein:
the second lens surface further satisfies the following conditional expression (2)', $$0.04 \text{ mm} \leq d_1' - d_0' \leq 1.00 \text{ mm} \quad (2)'$$

and the second lens surface further satisfies the following conditional expression (3)'

$$d_0' \leq 1.00 \text{ mm} \quad (3)'.$$

13. The lens according to claim 9, wherein:
the outer diameter $d_1'$ of the second lens surface is equal to or less than 5.00 mm.

14. The lens according to claim 9, wherein
the second lens surface further satisfies the following conditional expression (2)', $$0.04 \text{ mm} \leq d_1' - d_0' 1.00 \text{ mm} \quad (2)'$$

and
the outer diameter $d_1'$ of the second lens surface is equal to or less than 5.00 mm.

15. The lens according to claim 9, wherein:
the second lens surface further satisfies the following conditional expression (3)', $$d_0' \leq 1.00 \text{ mm} \quad (3)'$$

and the outer diameter $d_1'$ of the second lens surface is equal to or less than 5.00 mm.

16. The lens according to claim 9, wherein:
the second lens surface further satisfies the following conditional expression (2)', $$0.04 \text{ mm} \leq d_1' - d_0' \leq 1.00 \text{ mm} \quad (2)'$$

the second lens surface further satisfies the following conditional expression (3)', $$d_0' \leq 1.00 \text{ mm} \quad (3)'$$

and the outer diameter $d_1'$ of the second lens surface is equal to or less than 5.00 mm.

17. A lens comprising:
a first lens surface which transitions to a lens edge portion at a point where a first-order derivative for the first lens surface becomes discontinuous; and
a second lens surface which transitions to said lens edge portion at a point where a first-order derivative for the second lens surface becomes discontinuous, wherein:
the first lens surface satisfies the following conditional expression (1):

$$0.04 \text{ mm} \leq d_1 - d_0 \quad (1)$$

where
$d_0$ denotes a usable aperture of the first lens surface, and
$d_1$ denotes an outer diameter of the first lens surface, said outer diameter encompassing the lens surface up to said point where the first-order derivative for the first lens surface becomes discontinuous,
the second lens surface satisfies the following conditional expression (1)':

$$0.04 \text{ mm} \leq d_1' - d_0' \quad (1)'$$

where
$d_0'$ denotes a usable aperture of the second lens surface, and
$d_1'$ denotes an outer diameter of the second lens surface, said outer diameter encompassing the lens surface up to said point where the first-order derivative for the second lens surface becomes discontinuous, wherein the first lens surface is larger in usable aperture than the second lens surface.

18. The lens according to claim 17, wherein:

the first lens surface further satisfies the following conditional expression (2), $$0.04 \text{ mm} \leq d_1 - d_0 \leq 1.00 \text{ mm} \tag{2}$$

and the second lens surface further satisfies the following conditional expression (2)'

$$0.04 \text{ mm} \leq d_1' - d_0' \leq 1.00 \text{ mm} \tag{2)'}.$$

19. The lens according to claim 17, wherein:

the first lens surface further satisfies the following conditional expression (3), $$d_0 \leq 1.00 \text{ mm} \tag{3}$$

and the second lens surface further satisfies the following conditional expression (3)'

$$d_0' \leq 1.00 \text{ mm} \tag{3)'}.$$

20. The lens according to claim 17, wherein:

the first lens surface further satisfies the following conditional expression (2), $$0.04 \text{ mm} \leq d_1 - d_0 \leq 1.00 \text{ mm} \tag{2}$$

the second lens surface further satisfies the following conditional expression (2)', $$0.04 \text{ mm} \leq d_1' - d_0' \leq 1.00 \text{ mm} \tag{2)'}$$

the first lens surface further satisfies the following conditional expression (3), $$d_0 \leq 1.00 \text{ mm} \tag{3}$$

and the second lens surface further satisfies the following conditional expression (3)'

$$d_0' \leq 1.00 \text{ mm} \tag{3)'}.$$

21. The lens according to claim 17, wherein:

the outer diameter $d_1$ of the first lens surface is equal to or less than 5.00 mm, and the outer diameter $d_1'$ of the second lens surface is equal to or less than 5.00 mm.

22. The lens according to claim 17, wherein:

the first lens surface further satisfies the following conditional expression (2), $$0.04 \text{ mm} \leq d_1 - d_0 \leq 1.00 \text{ mm} \tag{2}$$

the second lens surface further satisfies the following conditional expression (2)', $$0.04 \text{ mm} \leq d_1' - d_0' \leq 1.00 \text{ mm} \tag{2)'}$$

the outer diameter $d_1$ of the first lens surface is equal to or less than 5.00 mm, and the outer diameter $d_1'$ of the second lens surface is equal to or less than 5.00 mm.

23. The lens according to claim 17, wherein:

the first lens surface further satisfies the following conditional expression (3), $$d_0 \leq 1.00 \text{ mm} \tag{3}$$

the second lens surface further satisfies the following conditional expression (3)', $$d_0' \leq 1.00 \text{ mm} \tag{3)'}$$

the outer diameter $d_1$ of the first lens surface is equal to or less than 5.00 mm, and the outer diameter $d_1'$ of the second lens surface is equal to or less than 5.00 mm.

24. The lens according to claim 17, wherein:

the first lens surface further satisfies the following conditional expression (2), $$0.04 \text{ mm} \leq d_1 - d_0 \leq 1.00 \text{ mm} \tag{2}$$

the second lens surface further satisfies the following conditional expression (2)', $$0.04 \text{ mm} \leq d_1' - d_0' \leq 1.00 \text{ mm} \tag{2)'}$$

the first lens surface further satisfies the following conditional expression (3), $$d_0 \leq 1.00 \text{ mm} \tag{3}$$

the second lens surface further satisfies the following conditional expression (3)', $$d_0' \leq 1.00 \text{ mm} \tag{3)'}$$

the outer diameter $d_1$ of the first lens surface is equal to or less than 5.00 mm, and the outer diameter $d_1'$ of the second lens surface is equal to or less than 5.00 mm.

* * * * *